UNITED STATES PATENT OFFICE.

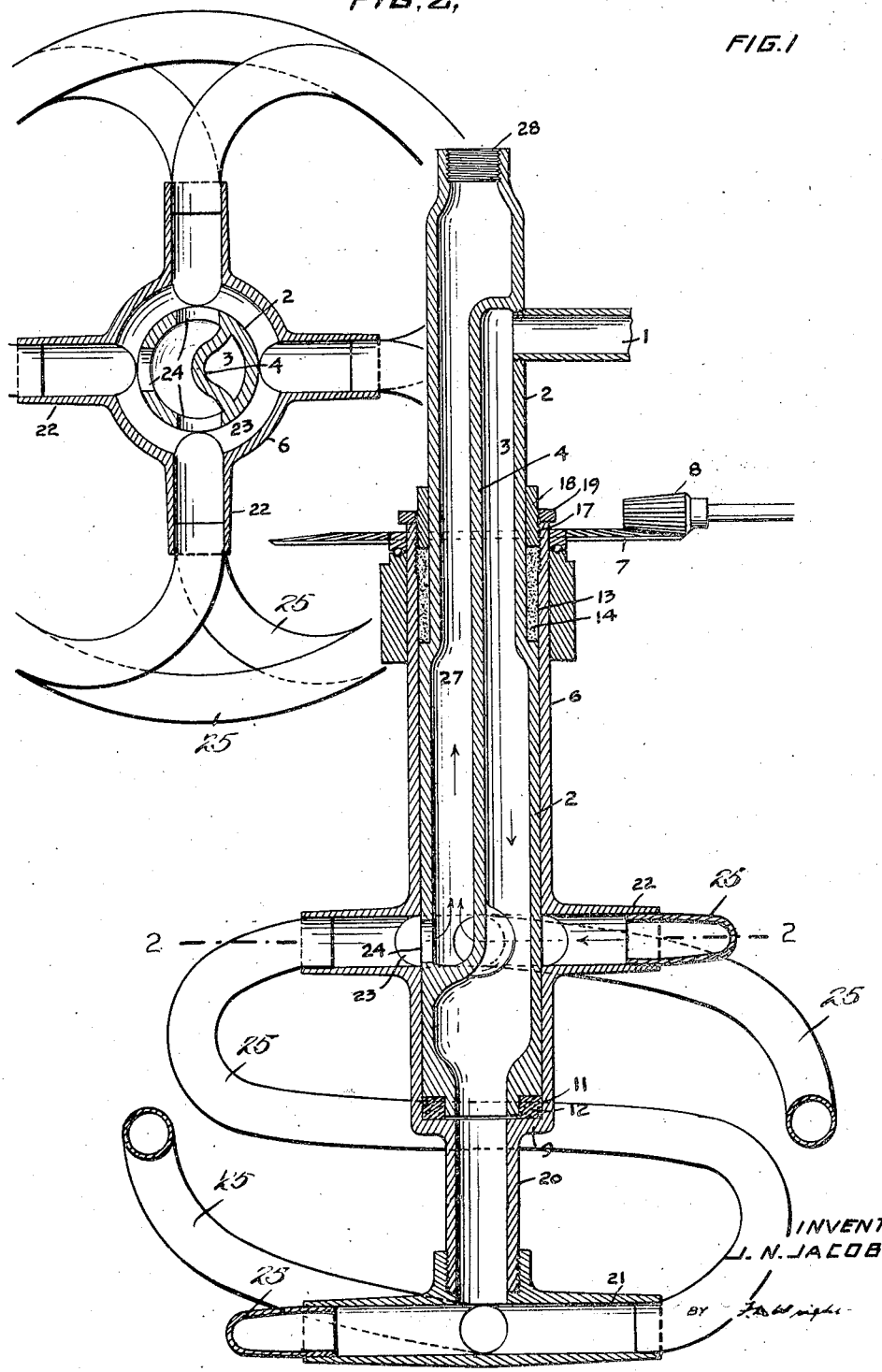

JENS N. JACOBSEN, OF OAKLAND, CALIFORNIA, ASSIGNOR OF ONE-HALF TO J. J. STEVENSON, OF OAKLAND, CALIFORNIA.

HEAD FOR HEAT-EXCHANGE COILS.

1,356,822.          Specification of Letters Patent.     Patented Oct. 26, 1920.

Application filed October 22, 1919. Serial No. 332,511.

*To all whom it may concern:*

Be it known that I, JENS N. JACOBSEN, a citizen of the United States, residing at Oakland, in the county of Alameda and State of California, have invented new and useful Improvements in Heads for Heat-Exchange Coils, of which the following is a specification.

The object of the present invention is to provide an improved stationary head for revolving coils through which liquids are circulated. It is primarily intended to be applied to coils such as those disclosed in patent to A. Jensen, No. 1,156,361, dated October 12, 1915, but may be used also with coils intended for other purposes.

In the accompanying drawing, Figure 1 is a broken vertical sectional view of my improved head, showing also the means for connecting the head to the coils; Fig. 2 is a horizontal section on the line 2—2 of Fig. 1.

Referring to the drawing, 1 indicates an intake pipe, an open end of which is screwed into the side of a stationary tube 2, said pipe 1 communicating with an intake compartment 3 formed in said tube 2 by a partition 4 extending longitudinally in said tube and at its ends extends laterally in opposite directions and connected with opposite sides of the tube 2.

Surrounding said tube 2 is a pipe 6 rotatable about its axis, the means for rotating it being here indicated as a bevel wheel 7 secured to the pipe 6 and a bevel pinion 8 meshing with said bevel wheel 7. Said pipe 6 is, below the tube 2 reduced in diameter to form an annular shoulder 9, and the lower end of the tube 2 is recessed externally to form with said shoulder a chamber 11 to receive packing 12. An upper portion of the tube 2, near the upper end of the pipe 6, is also recessed externally to form a chamber 13 to receive packing 14, and the upper end of the pipe 6 is internally threaded, as shown at 17, and screwed in said upper end of the pipe 6 is a stuffing gland 18, by which said packing 14 can be compressed in said chamber 13, a lock nut 19 being screwed on the exterior of said stuffing gland and abutting against the upper end of the pipe 6. By screwing down said stuffing gland in said pipe 6, not only can the packing 14 be compressed in the chamber 13, but also the tube 2 is pressed down in the pipe 6, and the packing 12 is compressed in the chamber 11, and thus a water-tight joint is made both at the lower and at the upper end of the space between the tube 2 and the pipe 6.

The liquid flows from the intake chamber into the reduced portion 20 of the pipe 6, down to the bottom of said pipe, and flows thence into a cross head 21 screwed on to the lower end of said portion 20, and thence flows into coils of pipe, 25, the upper ends of which are connected to lateral tubular extensions 22 of the pipe 6, the liquid flowing thence to the inner ends of said extensions and into an annular channel 23, which communicates with three holes 24, formed above the lower lateral extension of the partition 4, through the wall of the tube 2, into a discharge compartment 27 in said tube 2, the partition 4 being formed with integral extensions to extend around the two terminal holes 24. The discharge compartment is at the top provided with a connection 28 to an outlet pipe.

The advantage of this construction is that it permits of packing securely against leakage. These coils are often used for conducting brine, and a head such as that shown in the patent to Jensen above referred to, is very difficult to prevent from leaking, the brine leaking constantly and soon corroding the metal adjacent to the leaks. With my invention, it is seen that the packing can be compressed very firmly at both ends of the space between the revolving and stationary parts and thus leakage can be absolutely prevented.

An attendant advantage of my construction is that the heating liquid flows to the bottom of the coils and thus heats the bottom portion of the surrounding liquid first, which then, on account of its light specific gravity, flows upwardly, thus producing a circulation in the liquid to be heated.

I claim:—

1. The combination of a tube divided by a longitudinally extending partition into intake and discharge compartments, said partition at its ends extending laterally in opposite directions and connected to opposite sides of the tube and a pipe surrounding said tube and rotatable about its axis and reduced in diameter below the tube to form an annular chamber, the lower end of the tube being recessed externally to form with said shoulder a chamber, packing in said chamber, the upper portion of the tube being also recessed externally to form with said pipe a chamber, packing in said chamber, a stuffing gland screwed in the upper end of the pipe, the lower end of said pipe being open to permit liquid to flow therethrough, an upper portion of said pipe having an annular channel communicating with the discharge chamber through a hole in said tube.

2. The combination of a tube divided by a longitudinally extending partition into intake and discharge compartments, said partition at its ends extending laterally in opposite directions and connected to opposite sides of the tube and a pipe surrounding said tube and rotatable about its axis and reduced in diameter below the tube to form an annular chamber, the lower end of the tube being recessed externally to form with said shoulder a chamber, packing in said chamber, the upper portion of the tube being also recessed externally to form with said pipe a chamber, packing in said chamber, a stuffing gland screwed in the upper end of the pipe, the lower end of said pipe being open to permit liquid to flow therethrough, an upper portion of said pipe having an annular channel communicating with the discharge chamber through holes in said tube, said partition being extended around said holes.

JENS N. JACOBSEN.